United States Patent Office 2,832,073
Patented Apr. 22, 1958

2,832,073

CONTROL SYSTEM

Henry Arkus, Brooklyn, and Louis Gerold, Bethpage, N. Y., assignors to Hazeltine Research, Inc., Chicago, Ill., a corporation of Illinois Application November 10, 1954, Serial No. 468,041

14 Claims. (Cl. 343—11)

*General*

This invention relates to control systems and, particularly, to such systems of the type useful in a target-indicating system for displaying target indications and a target-locator indication adjustable relative thereto.

For some radar-type plan-position-indicator or target-indicating systems, it is desirable that the target scene or geographical range of view of the surrounding terrain displayed on the display screen of the system be adjustable. In this manner the target scene on the display screen may be expanded to afford more accurate observation of targets.

For some applications, it is also desirable that the target-indicating system be capable of determining the relative range and bearing between various target indications shown on the display screen. This would be particularly useful for enabling a radar control station to direct interceptor aircraft to the location of unidentified or enemy aircraft. In furtherance of this objective, it is desirable that an adjustable target-locator indication or cursor be displayed on the display screen of the target-indicating system for giving the operator some perceptible means of determining the desired relative range and bearing.

For ease and rapidness of operation, which is particularly desirable where the time factor is critical, the position of the cursor on the display screen preferably is controlled by a joy-stick type control. Also, in order to achieve rapid target evaluation, it is desirable that the cursor origin or initial starting point of the cursor, which may have previously been located on a particular target indication, automatically follow or track that target indication as the range of view is expanded or contracted. This serves to prevent losing sight of the target indication as the range of view is changed rapidly and eliminates the necessity for relocating the cursor origin after such change.

In addition, for maximum efficiency and minimum delay in operation, it is also desirable that the relationship between movement of the cursor origin joy-stick control and the corresponding displacement of the cursor origin indication on the display screen be constant. This enables the operator to develop a "feel" for the amount of cursor origin displacement he will obtain for a given movement of the joy-stick control and, thus, enables more rapid and efficient positioning of the cursor origin over a new target indication. As will be pointed out hereinafter, the circuit requirements for a constant joy-stick movement cursor origin displacement relationship are inherently in conflict with the circuit requirements necessary to achieve automatic tracking of the target as the range of view is changed.

That the advantage of a constant "feel" joy-stick control is a substantial advantage is indicated by the fact that if the joy-stick control was not of this type, then the maximum movement of the joy-stick control would need to be capable of causing deflection of the cursor origin to the edge of the display screen for the least sensitive operating condition of the system, namely, when the entire range of view of the radar system is displayed on the display screen. For a target-indicating system capable of a substantial expansion of the target scene on the display screen, this would result in a particularly undesirable degree of "coarseness" in the operation of the joy-stick control when working with an expanded target scene. That is, for an expanded target scene, a slight movement of the joy-stick control would cause an undesirably large displacement of the cursor origin.

It is also desirable in some radar target-indicating systems to make provision for off-centering the target scene displayed on the display screen of the system. This feature is particularly advantageous in a target-indicating system of the type under discussion which provides for adjustment of the geographical range of view displayed on the display device because the combination of these features enables any portion of the surrounding geographical terrain within the maximum range of the radar system to be expanded and observed in greater detail, although, for simplicity of circuitry, the maximum degree of expansion around a particular target may be limited by the amount of off-centering being used, the PRF, and the design of the gate control circuits. Thus, part of a preferred procedure for determining the relative range and bearing between target indications on the display screen is for the operator to place the origin of the cursor over the desired target indication, to off-center the target scene to bring the cursor origin and target indication to the center of the display screen, and then to expand the target scene a desired amount. It is, therefore, desirable that the off-centering adjustment not interfere with automatic tracking of the target indication by the cursor origin as the target scene is off-centered.

In such a target-indicating system, it would appear that the joy-stick should be capable of positioning the cursor origin over any portion of the possible geographical range of view in order to control the cursor origin regardless of the amount the cursor origin might be off-centered. This has the same disadvantage as was mentioned in connection with the adjustable range of view feature, namely, that slight movement of the joy-stick control would cause a full deflection of the cursor origin across the display screen. This result may be advantageously avoided by restricting the position of the cursor origin to the area of the display screen regardless of the amount the target scene is off-centered. In this manner the position of the joy-stick control would represent a corresponding position of the cursor origin on the display screen regardless of the amount of off-centering, which would be a desirable feature when shifting the cursor origin to a new target indication. This feature, however, conflicts in system requirements with the feature that the origin of the cursor automatically track a target indication as the target scene is off-centered.

It is an object of the invention, therefore, to provide a new and improved control system for use in a target-indicating system which avoids one or more of the foregoing limitations.

It is another object of the invention to provide a new and improved control system for use in a target-indicating system to enable rapid and efficient positioning of a target-locator indication by a joy-stick control.

It is another object of the invention to provide a new and improved joy-stick control system for use in a target-indicating system and having the advantage of a constant joy-stick movement and target-locator indication displacement relationship while retaining the advantage of automatic tracking of a target indication as the range of view is changed.

It is a further object of the invention to provide a new and improved joy-stick control system for use in a target-indicating system and having the advantage of a fixed relationship between the position of a joy-stick control and the position of a target-locator indication origin while retaining the advantage of automatic tracking of a target indication as off-centering of the target scene is adjusted.

In accordance with the invention, a control system, utilized in a target-indicating system for displaying target indications and a target-locator indication adjustable relative to the target indications and including a target-indicator and target-locator display device, comprises first circuit means for supplying time-shared target-indication and target-locator sweep signals and for applying the sweep signals to the display device. The control system also includes adjustable electromechanical control means including a control element having two dimensions of adjustment for supplying first and second control signals individually representative of adjustments of the control element with respect to the dimensions. The control system further includes a pair of pedestal-generating circuit means individually responsive to the control signals for supplying first and second target-locator position-control pedestal signals to the first circuit means for effecting a two-dimensional displacement of the target-locator indication on the display device.

Also in accordance with the invention, a control system, utilized in a target-indicating system for displaying target indications and a target-locator indication adjustable relative to the target indications and including a target-indicator and target-locator display device, comprises circuit means for supplying target-indication and target-locator sweep signals and adjustable control means having two operating modes for supplying target-locator position-control signals. The control system also includes adjustable circuit means coupled to the signal-supply circuit means, to the adjustable control means, and to the display device for adjusting a characteristic of the sweep and position-control signals and for applying the adjusted signals to the display device. The control system further includes compensating means coupled to the adjustable control means and responsive to adjustment of the adjustable circuit means during one of the operating modes for providing a predetermined relationship between adjustment of the control means and displacement of the target-locator indication on the display device.

For a better understanding of the present invention, together with other and further objects thereof, reference is had to the following description taken in connection with the accompanying drawings, and its scope will be pointed out in the appended claims.

Referring to the drawings.

Figure 3A:
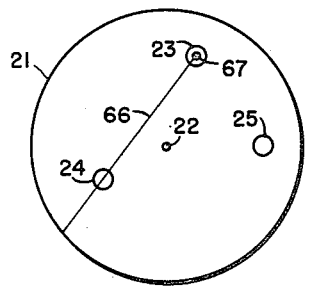
Figure 3B:
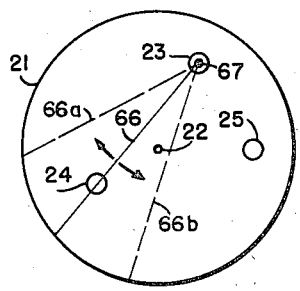
Figure 3C:
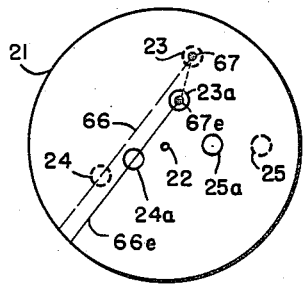
Figure 3D:
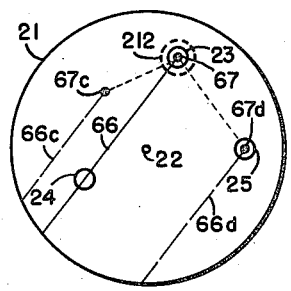
Figure 3E:
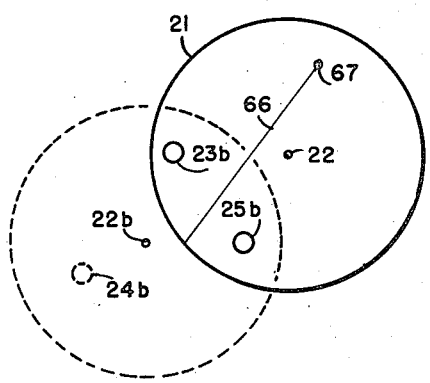
Figure 4:
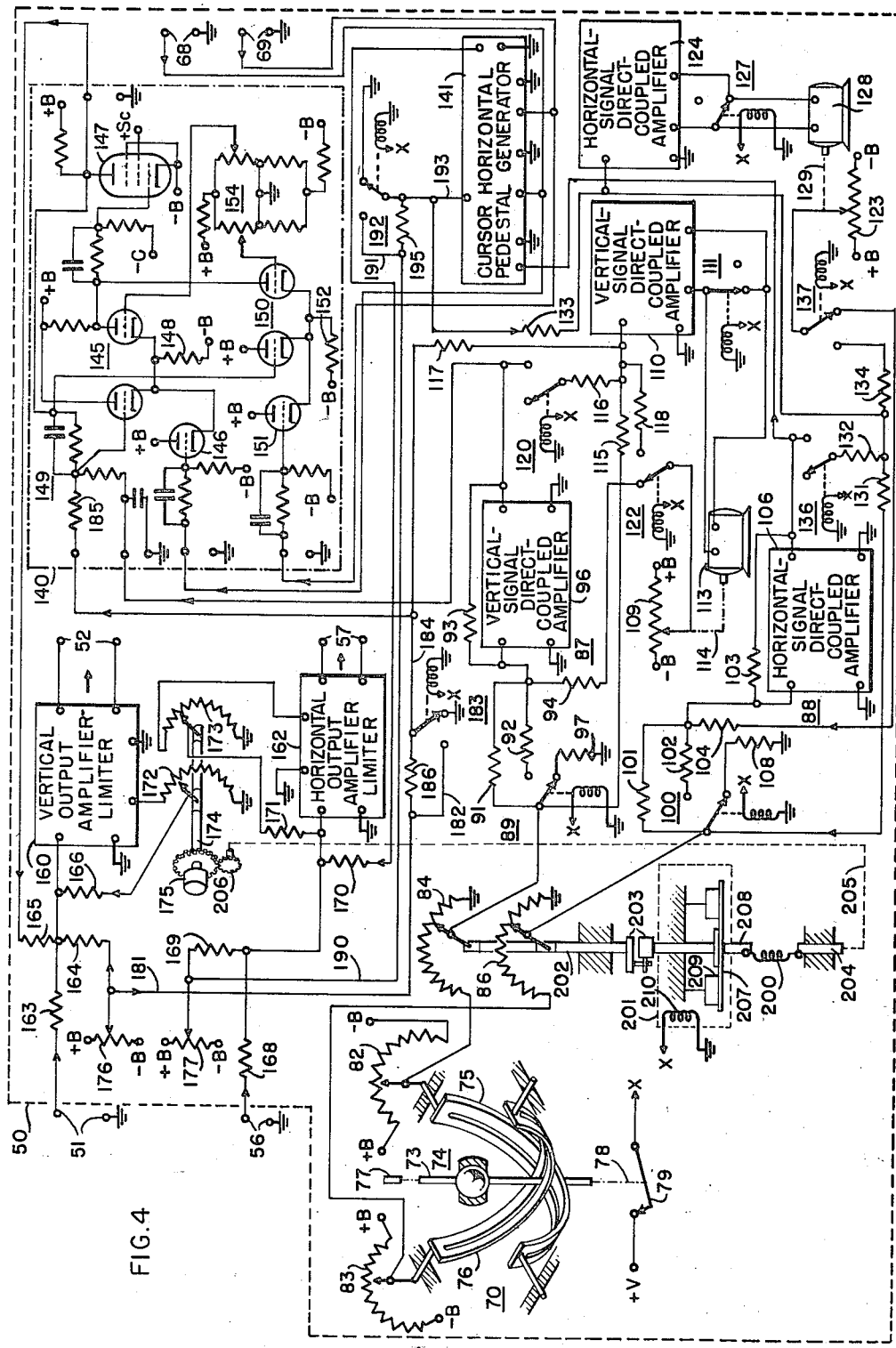

Figs. 3a–3e, inclusive, are diagrams representing various positions and movements of a target-locator indication or cursor on a display screen; and Fig. 4 is a detailed circuit diagram, partly schematic, of a control system constructed in accordance with the present invention.

Figure 1:
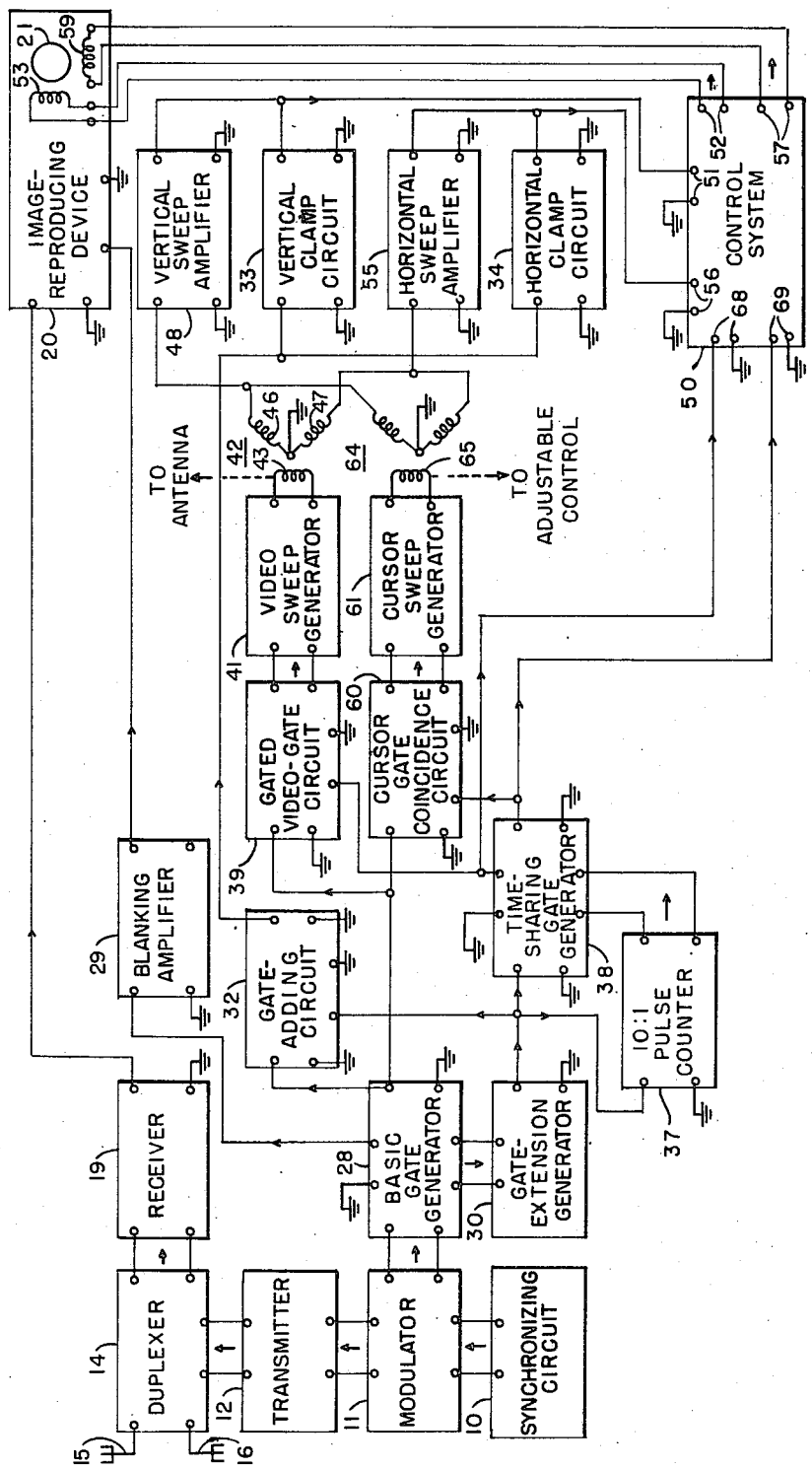
Fig. 1 is a circuit diagram, partly schematic, of a complete radar system including a target-indicating system having a control system constructed in accordance with the present invention.

*Description of radar system of Fig. 1*

Referring to Fig. 1 of the drawings, the radar system there represented comprises a synchronizing circuit 10 for timing the firing of a modulator 11 which, in turn, controls a transmitter 12. The transmitter 12 is coupled through a duplexer 14 to a rotatable directional antenna system 15, 16. The antenna system 15, 16 is also coupled through the duplexer 14 to a receiver 19 for deriving and supplying the video components of radar reply signals to an image-reproducing device 20 including a display screen 21. The units 10–12, inclusive, 14, and 19–21, inclusive, and antenna system 15, 16 may be of conventional construction.

Also coupled to the modulator 11 and synchronized thereby is a basic gate generator 28 which may be, for example, of the conventional "one-shot" multivibrator type. The gate generator 28 is coupled to a blanking amplifier 29 for supplying amplified basic gating pulses to the image-reproducing device 20 for rendering the device nonconductive during intervals intervening sweep intervals. Also coupled to the basic gate generator 28 is a gate-extension generator 30 which may be of the conventional triggered "one-shot" multivibrator type. The gate-extension generator 30 is, in turn, coupled to a gate-adding circuit 32 which is also coupled to the basic gate generator 28 for combining gate-extension pulses with basic gating pulses to supply extended gating pulses to vertical and horizontal clamp circuits 33 and 34, respectively, coupled thereto.

The gate-extension generator 30 is also coupled to a 10:1 pulse counter 37 which, after every tenth gate-extension pulse, supplies an output trigger pulse to a time-sharing gate generator 38. The gate-extension generator 30 is also directly coupled to the time-sharing gate generator 38. The 10:1 pulse counter may be of the conventional energy-storage or so-called "staircase" type while the time-sharing gate generator 38 may be of the conventional bistable multivibrator or so-called "flip-flop" circuit type.

Both the time-sharing gate generator 38 and the basic gate generator 28 are coupled to a gated video-gate circuit 39 for supplying periodic gating pulses minus every tenth gating pulse to a video sweep generator 41 for supplying periodic sweep signals to a signal resolver 42 coupled thereto. The gated circuit 39 and sweep generator 41 may be of conventional construction and the signal resolver 42 may be of the conventional synchro type having a rotor winding 43 and a pair of stator windings 46, 47 in space quadrature. The rotor winding 43 of the signal resolver 42 preferably is coupled by some suitable means, not shown, to the rotatable antenna system 15, 16 for resolving the periodic video sweep signals into horizontal and vertical components in accordance with the rotation of the antenna system 15, 16.

A vertical sweep-signal component of the video sweep signals is supplied by the stator winding 46 of the signal resolver 42 to a vertical sweep amplifier 48 which, in turn, is coupled through terminals 51, 51 and 52, 52 of a control system 50 to a vertical deflection winding 53 of the image-reproducing device 20. A horizontal sweep-signal component of the video sweep signal is supplied by the stator winding 47 of the signal resolver 42 to a horizontal sweep amplifier 55 which, in turn, is coupled through terminals 56, 56 and 57, 57 of the control system 50 to a horizontal deflection winding 59 of the image-reproducing device 20. The control system 50 is constructed in accordance with the present invention and will be more fully described hereinafter.

The output circuits of the vertical and horizontal sweep amplifiers 48 and 55, respectively, preferably are also individually coupled to clamp circuits 33 and 34 which may be, for example, of construction similar to the circuit disclosed and claimed in U. S. Patent 2,675,472 of Henry Arkus entitled "Automatic Potential-Control System" granted April 13, 1954.

Both the time-sharing gate generator 38 and the basic gate generator 28 are also coupled to a cursor gate coincidence circuit 60 for supplying to a cursor sweep generator 61 coupled thereto periodic gating pulses occurring during time intervals corresponding to every tenth deleted video gating pulse interval. The cursor sweep generator 61, in turn, is coupled to the signal resolver 64, the rotor 65 of which is preferably coupled to a suitable manual control, not shown, for adjusting the resolution of periodic cursor sweep signals supplied thereto by generator 61. The signal resolver 64 is coupled to the sweep amplifiers 55 and 48 for supplying horizontal and vertical cursor sweep-signal components thereto and through the control system 50 to the respective deflection windings 53 and 59 of the image-reproducing device 20. Also, the time-sharing gate generator 38 is coupled to terminals 68, 68 and 69, 69 of the control system 50 for control purposes explained subsequently.

The above-mentioned units of the radar target-indicating system of Fig. 1, with the exception of the control system 50, may all be of conventional construction and operation so that a detailed description and explanation of the operation thereof are unnecessary herein.

Operation of radar system of Fig. 1

Considering briefly, however, the general operation of the above-described radar system as a whole, the synchronizing circuit 10 supplies periodic synchronizing pulses to the modulator 11 which, in response thereto, supplies corresponding modulating pulses to the transmitter 12 for enabling the transmitter 12 to generate bursts or pulses of radio-frequency energy which are supplied through the duplexer 14 to the rotating radar antenna system 15, 16. The duplexer 14 enables the antenna system 15, 16 also to be used as the receiving antenna while protecting the receiver 19 from the high-power bursts of energy from the transmitter 12. The receiver 19 is effective to derive and amplify the video-frequency components of the radio-frequency radar reply signals intercepted by the antenna system 15, 16. The receiver 19 supplies these video components which contain the target information to the image-reproducing device 20 for enabling corresponding target indications to appear on the display screen 21. Referring for the moment to Fig. 3a, there is represented a view of the display screen 21 whereon representative target indications 23, 24, and 25 are shown. In connection with Fig. 3a, it will be assumed that the center of the geographical view of the surrounding terrain, as indicated by point 22, corresponds to the center of the display screen 21.

Figure 2:
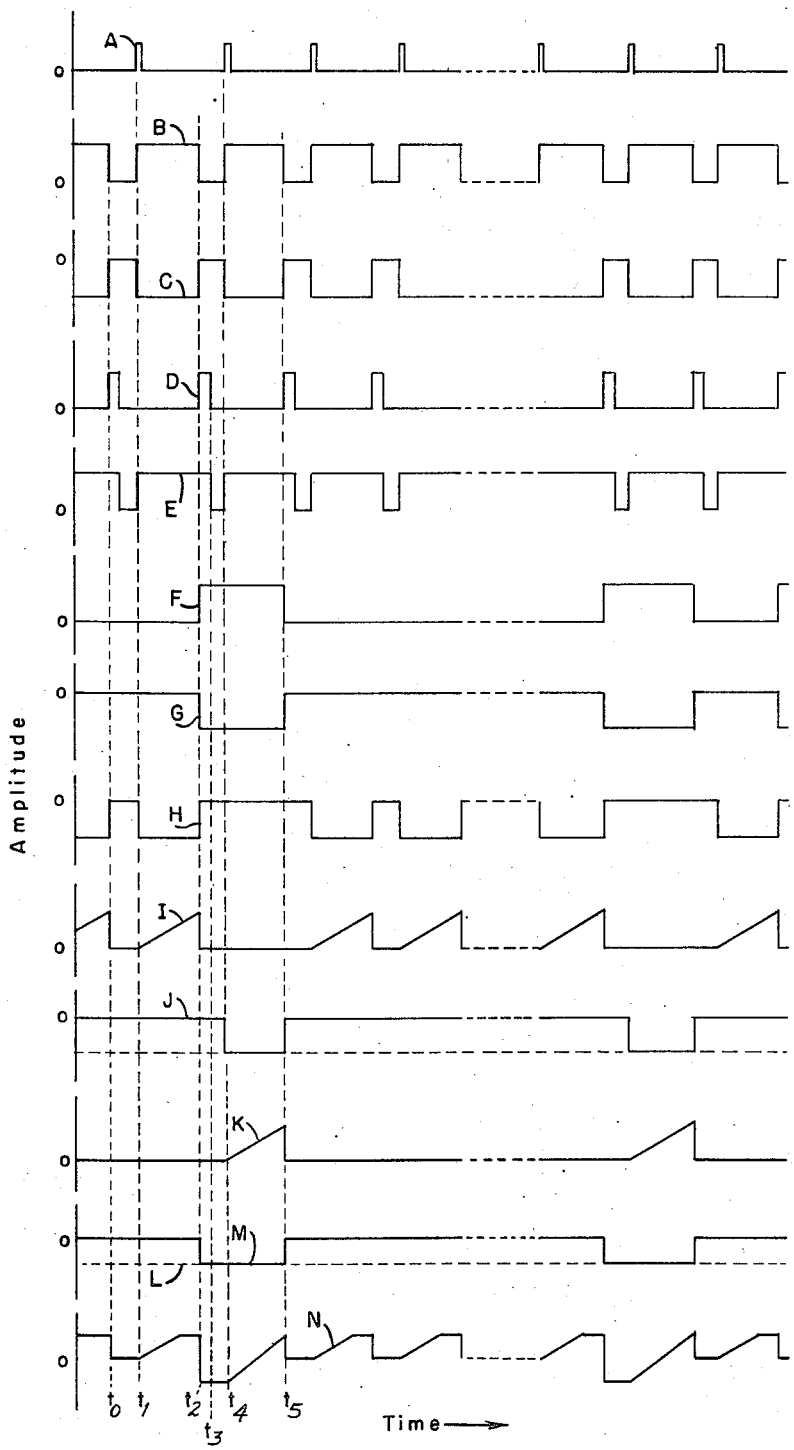
Fig. 2 is a graph representing signals developed at various points of the Fig. 1 radar system and used in explaining the operation thereof.

Referring again to Fig. 1, the modulator 11 also supplies synchronizing pulses, as represented by curve A of Fig. 2, to the basic gate generator 28 which, in turn, generates positive basic gating pulses, represented by curve B of Fig. 2, and negative basic gating pulses, as represented by curve C of Fig. 2, during time intervals such as intervals $t_1$—$t_2$ and $t_4$—$t_5$. Basic gating pulses similar to those represented by curve B of Fig. 2 are supplied to the blanking amplifier 29 wherein the pulses are amplified and then supplied to the image-reproducing device 20 for rendering that device nonconductive during intervals intervening the basic gating intervals, for example, during the intervals $t_0$—$t_1$ and $t_2$—$t_4$ as indicated on Fig. 2.

Negative basic gating pulses represented by curve C of Fig. 2 are supplied by the basic gate generator 28 to the gate-extension generator 30 for triggering the generator 30 in synchronism with the positive-going trailing edges thereof. In response thereto, the gate-extension generator 30 generates relatively short duration pulses, represented by curve D of Fig. 2, of, for example, 60 microseconds duration and occurring just after the termination of the trailing edges of the negative basic gating pulses represented by curve C, for example, during time interval $t_2$—$t_3$ as indicated on Fig. 2. These positive gate-extension pulses are supplied to the gate-adding circuit 32. Also supplied to the gate-adding circuit 32 are basic gating pulses represented by curve B of Fig. 2. The gate-adding circuit 32 combines individual gate-extension pulses with corresponding basic gating pulses to produce extended gating pulses represented by curve E of Fig. 2 and exceeding the duration of the basic gating pulses by an amount equal to the duration of the gate-extension pulses. The resultant extended gating pulses of curve E are supplied to the clamp circuits 33 and 34 to maintain these circuits inoperative for an extended period to permit satisfactory translation of sweep signals to be mentioned hereinafter.

The gate-extension pulses represented by curve D of Fig. 2 are also supplied to the 10:1 pulse counter 37 which, upon every tenth gate-extension pulse supplied thereto, generates an output trigger pulse which is supplied to the time-sharing gate generator 38 and which is effective to change the operating mode thereof. The gate-extension pulses are also supplied directly to the time-sharing gate generator 38 and the gate-extension pulse occurring one gate period after the change in operating mode of the time-sharing gate generator 38 is effective to trigger generator 38 back to the original operating mode thereof. Thus, during intervals, such as the interval $t_2$—$t_5$, there is generated by the time-sharing gate generator 38 positive and negative time-sharing gating pulses represented by curves F and G of Fig. 2.

The negative time-sharing gating pulses of curve G of Fig. 2 are supplied to the gated video-gate circuit 39. Also supplied to the gated video-gate circuit 39 are positive basic gating pulses represented by curve B of Fig. 2. In the absence of time-sharing gating pulses represented by curve G, the gated circuit 39 is effective to invert and translate the basic gating pulses represented by curve B. During the occurrence of a time-sharing gating pulse represented by curve G, however, the gated circuit does not translate a basic gating pulse. There is thus produced at the output of the gated video-gate circuit 39 video gating pulses, represented by curve H of Fig. 2, which correspond to the basic gating pulses except that no video gating pulse occurs during every tenth basic gating interval such as, for example, the interval $t_4$—$t_5$ of Fig. 2.

The resultant video gating pulses represented by curve H are supplied to the video sweep generator 41 which, in response thereto, generates video sweep signals corresponding to curve I of Fig. 2. The video sweep signals are, in turn, supplied to the signal resolver 42 which derives from each of these sweep signals vertical and horizontal video sweep-signal components, the polarity and relative magnitude of the components varying in time in accordance with rotation of the rotor winding 43 which rotates in synchronism with the rotating antenna system 15, 16.

Vertical video sweep-signal components are supplied by the stator winding 46 of the signal resolver 42 to the vertical sweep amplifier 48 wherein they are amplified and then supplied through terminals 51, 51 and 52, 52 of the control system 50 to the vertical deflection winding 53 of the image-reproducing device 20. Horizontal video sweep-signal components are similarly supplied by the stator winding 47 to the horizontal sweep amplifier 55 wherein they are amplified and then supplied through terminals 56, 56 and 57, 57 of the control system 50 to the horizontal deflection winding 59. The video sweep-signal components supplied to the deflection windings 53 and 59 are effective to control the sweep of an intensity-modulated electron beam of the image-reproducing device 20 across the display screen 21 to trace the target scene thereon.

Positive time-sharing gating pulses represented by curve F of Fig. 2 are supplied by the time-sharing gate generator 38 to the cursor gate coincidence circuit 60. The basic gate generator 28 also supplies basic gating pulses of curve B of Fig. 2 to the cursor gate coincidence circuit 60. The coincidence circuit 60 is effective to pass a basic gating pulse only during the occurrence of a positive time-sharing gating pulse, such as the one represented by curve F during the time interval $t_2$—$t_5$. There is thus produced at the output of the cursor gate coincidence circuit 60 cursor gating pulses, represented by curve J of Fig. 2, which occur during time intervals corresponding to the basic gating intervals during which no video gating pulses, represented by curve H, occur.

The cursor gating pulses represented by curve J are supplied to the cursor sweep generator 61 which, in response thereto, generates cursor sweep signals represented by curve K of Fig. 2. These sweep signals are, in turn, supplied to the signal resolver 64 which resolves them into vertical and horizontal components which are supplied to the respective sweep amplifiers 48 and 55 wherein they are amplified and then supplied through the control system 50 to the respective deflection windings 53 and 59 of the image-reproducing device 20.

The cursor sweep-signal components supplied to the deflection windings 53 and 59 are effective to control the sweep of the electron beam of the image-reproducing device 20 across the display screen 21 to produce thereon a cursor indication, represented by the straight line trace 66 indicated on the view of the display screen 21 of Fig. 3a. The origin or initial starting point 67 of the cursor trace 66 may be positioned, for example, at the target indication 23 and the cursor 66 may pass through the target indication 24 as shown in Fig. 3a. In this position the cursor 66 is effective in conjunction with suitable electronic computer means, not shown, associated with the control circuits thereof to indicate the relative range and bearing of target indication 24 with respect to target indication 23.

Rotation of the rotor winding 65 of the cursor sweep-signal resolver 64 by a suitable control, not shown, is effective to alter the resolution of the cursor sweep signals into vertical and horizontal sweep-signal components, thereby to cause rotation of the cursor 66 about its origin 67. Thus, the cursor 66 may be adjusted to positions such as represented, for example, by either of the dashed-line cursor traces 66a and 66b of Fig. 3b.

The time-sharing gate generator 38 supplies to the terminals 68, 68 and 69, 69 of the control system 50 negative and positive time-sharing gating pulses, represented by curves G and F of Fig. 2, for control purposes as will be explained more fully hereinafter.

*Description of control system of Fig. 4*

Referring again to the drawings, in a target-indicating system for displaying target indications, such as, for example, indications 23–25, inclusive, of Fig. 3a, and a target-locator indication, such as, for example, the cursor indication 66 of Fig. 3a, adjustable relative thereto and including a target-indicator and target-locator display device, for example, the image-reproducing device 20 of Fig. 1, a control system 50 constructed in accordance with the present invention comprises circuit means for supplying time-shared target-indication and target-locator sweep signals. The sweep-signal supply circuit means may include, for example, the input terminals 51, 51 and 56, 56 of the control system 50 which are coupled to the video and cursor sweep generators 41 and 61, signal resolvers 42 and 64, and the vertical and horizontal sweep amplifiers 48 and 55, as shown in Fig. 1, for supplying target-indication sweep signals, such as, for example, the video sweep signals represented by curve I of Fig. 2, and target-locator sweep signals, such as, for example, the cursor sweep signals represented by curve K of Fig. 2.

The control system, as shown in Fig. 4, also comprises adjustable control means having two operating modes for supplying target-locator position control signals, which adjustable control means may include as the major units thereof a joy-stick control means 70, amplifier circuit means 87 and 88, and cursor pedestal generators 140 and 141. The joy-stick control means 70 may constitute, for example, adjustable electromechanical control means having coarse and vernier operating modes and including a joy-stick control element 73 having two dimensions of adjustment for supplying first and second direct-current control signals individually representative of adjustments of the joy-stick control element 73 with respect to the dimensions. The joy-stick control element 73 may, for example, be pivoted by means of a ball and socket support 74 and the lower portion may engage longitudinal slots of a pair of movable gimbal ring segments 75 and 76 disposed at right angles to each other. Mechanically connected to the movable gimbal segment 75 is an adjustable voltage divider 82 for supplying an adjustable potential control signal representative of the component of adjustment of the joy-stick control element 73 in a direction normal to the center slot of the gimbal 75. In a similar manner, an adjustable voltage divider 83 is mechanicaly connected to the movable gimbal segment 76. The electromechanical control means 70 preferably is of the compound type, that is, it preferably has a suitable mechanical control 77 mechanically connected, as indicated by a broken line 78, to a switch 79 for controlling the supply of a relay control potential +V to actuating windings of various relay-controlled switches, as will be mentioned more fully hereinafter, thus providing two operating modes for the electromechanical control means 70.

The amplifier circuit means 87 and 88 of the adjustable control means preferably constitute amplifier circuit means responsive to adjustment of the electromechanical control means 70 for amplifying the control signals by a first factor during a first operating mode of the electromechanical control means 70 and by a second factor during a second operating mode thereof. The amplifier circuit means may include, for example, a pair of direct-coupled amplifier circuit means 87 and 88 individually responsive to the two potential control signals representative of adjustment of the electromechanical control means 70 for amplifying the control signals by a large factor, for example, a factor of five, during a coarse operating mode of the electromechanical control means 70 and by a relatively small factor, for example, unity, during a vernier operating mode thereof. The amplifier circuit means 87 may include, for example, a relay-controlled switch 89, an adding circuit coupled thereto and comprising the resistors 91–94, inclusive, and a vertical-signal direct-coupled amplifier 96 of conventional construction and having an input circuit coupled to the adding resistors 91–94, inclusive, and resistor 97. Similarly, the amplifier circuit means 88 may include, for example, a relay-controlled switch 100, an adding circuit comprising resistors 101–104, inclusive, and a horizontal-signal direct-coupled amplifier 106 of conventional construction.

The control system 50 also preferably comprises means responsive to the amplified control signals supplied by the amplifier circuit means 87 and 88 for storing information representative thereof during the first operating mode. The information-storage means may include, for example, similar vertical and horizontal storage circuit means. The vertical storage circuit means includes, for example, an adjustable voltage divider 109 coupled across a potential source —B, +B and electromechanical means comprising, for example, a vertical-signal direct-coupled amlifier 110 of conventional construction coupled to the amplifier circuit means 87, a relay-controlled switch 111, and a motor 113, the electromechanical means being responsive to the amplified vertical control signal for adjusting the voltage-divider means 109 to store a potential representative of the amplified vertical control signal supplied by the amplifier circuit means 87 during the coarse operating mode of the electromechanical control means 70.

Coupled to the input circuit of the vertical-signal direct-coupled amplifier 110 is a signal-adding circuit comprising input resistors 115–118, inclusive. The input resistor 116 is coupled through a relay-controlled switch 120 to the output circuit of the vertical-signal direct-coupled amplifier 96 for supplying amplified vertical control signals to the vertical-signal direct-coupled amplifier 110. The adjustable arm of the voltage divider 109 is coupled to a relay-controlled switch 122 for supplying the stored potential to either the input resistor 94 of the vertical-signal direct-coupled amplifier 96 or to the input resistor 118 of the vertical-signal direct-coupled amplifier 110, depending on the operating mode of the electromechanical control means 70.

Similarly, the horizontal storage circuit portion of the information-storage means may, for example, include an adjustable voltage-divider 123 coupled to the source +B, −B and electromechanical means comprising, for example, a horizontal-signal direct-coupled amplifier 124 of conventional construction coupled to the amplifier circuit means 88, a relay-controlled switch 127, and a motor 128 mechanically connected, as indicated by broken line 129, to the movable arm of the voltage divider 123, the electromechanical means being responsive to the amplified horizontal control signal for adjusting the voltage-divider means 123 to store a potential representative of the amplified horizontal control signal supplied by the amplifier circuit means 88 during the coarse operating mode of the electromechanical control means 70. Likewise, there is a signal-adding circuit represented by resistors 131–134, inclusive, coupled to the input circuit of the horizontal-signal direct-coupled amplifier 124. The input resistor 132 is connected through a relay-controlled switch 136 to the output circuit of the horizontal-signal direct-coupled amplifier 106. The movable arm of the voltage divider 123 is coupled through a relay-controlled switch 137 to either the input resistor 104 of the horizontal-signal direct-coupled amplifier 106 or to the input resistor 134 of the horizontal-signal direct-coupled amplifier 124.

The vertical and horizontal cursor pedestal generators 140 and 141, respectively, of the control system 50 are individually responsive to the control signals supplied by the amplifier circuit means 87 and 88 for supplying first and second target-locator position-control pedestal signals to the output terminals 52, 52 and 57, 57 of the control system 50 for effecting a two-dimensional displacement of the target-locator indication or cursor on the display device 20 of Fig. 1. The cursor vertical pedestal generator 140 is represented in detail and may comprise, for example, a cathode-coupled amplifier stage 145 having input electrodes coupled to the vertical-signal direct-coupled amplifier 96 and output electrodes coupled to an amplifier tube 147. The anode of the amplifier tube 147 is coupled through a feed-back resistor-condenser network 149 to the input electrodes of the cathode-coupled amplifier stage 145. Coupled to a cathode resistor 148 of the amplifier stage 145 is a gating pulse-responsive control tube 146 having input electrodes coupled to the negative time-sharing gating-pulse input terminals 68, 68 of the control system 50 for controlling the conductivity of the cathode-coupled amplifier stage 145 to enable generation of pedestal signals during cursor sweep intervals.

The pedestal generator 140 may also include means for clamping or maintaining constant the potential level at the anode of the amplifier tube 147 during time intervals intervening the cursor sweep intervals. The clamping means may include, for example, a cathode-coupled amplifier stage 150 coupled between the anode and the control electrode of the amplifier tube 147 to provide a feed-back path for maintaining the anode potential level of the amplifier tube 147 at a desired value. Coupled to a cathode resistor 152 of the amplifier stage 150 is a gating pulse-responsive control tube 151 having the input electrodes coupled to the positive time-sharing gating pulse input terminals 69, 69 of the control system 50 for enabling operation of the cathode-coupled amplifier stage 150 only during intervals intervening cursor sweep intervals. Both of the direct-coupled amplifier stages 145 and 150 may be coupled to an adjustable bias-potential supply network 154 for controlling the operating level of stage 145 and for controlling the potential level at which the anode of amplifier tube 147 is maintained by stage 150 during intervals intervening the cursor sweep intervals. The cursor horizontal pedestal generator 141 may be of construction similar to that of the vertical pedestal generator 140.

The control system 50 also preferably includes adjustable circuit means coupled to the sweep-signal supply circuit means comprising the input terminals 51, 51 and 56, 56 of the control system 50, to the adjustable electromechanical control means 70, and to the display device 20 of Fig. 1 through the terminals 52, 52 and 57, 57 for adjusting a characteristic of the sweep signals supplied at the terminals 51, 51 and 56, 56 and of the position-control signals supplied by the means 70 and for applying the adjusted signals to the display device. With respect to an adjustable range of view compensation feature of the present control system 50, as will be mentioned more fully hereinafter, the adjustable circuit means may comprise, for example, vertical and horizontal output amplifier-limiters 160 and 162, respectively, including means for adjusting the effective amplification factor of the amplifiers, which means comprises a pair of adjustable feed-back voltage dividers 172 and 173. Connected to the input circuit of the amplifier-limiter 160 is a signal-adding circuit comprising resistors 163–166, inclusive. The input resistor 163 is coupled between the vertical sweep-signal input terminals 51, 51 of the control system 50 and the amplifier-limiter 160 for supplying target-indication and cursor vertical sweep-signal components thereto.

Similarly, there is coupled to the input circuit of the horizontal amplifier-limiter 162 a similar signal-adding circuit comprising resistors 168–171, inclusive, the input resistor 168 being coupled between the horizontal sweep-signal input terminals 56, 56 and the amplifier-limiter 162 for supplying the horizontal sweep-signal components thereto. The movable arms of the feed-back voltage dividers 172 and 173 are coupled back to the input circuits of the amplifier-limiters 160 and 162 through the respective input resistors 166 and 171 to control the magnitude of the feed-back signals and, thus, the effective amplification factor or gain of the amplifiers. The movable arms of both feed-back voltage dividers 172 and 173 are mechanically connected to a shaft 174 which, in turn, is connected to an amplifier gain-control knob 175 for simultaneously varying the effective gain of the amplifier portion of both amplifier-limiters. The amplifier-limiters 160 and 162 may each be similar to the system disclosed and claimed in U. S. Patent No. 2,668,237 of Jasper J. Okrent, entitled "Signal Magnitude Control System," patented Feb. 2, 1954.

With respect to an off-centering compensation feature of the control system 50, as will be mentioned more fully hereinafter, the adjustable circuit means may comprise adjustable potential-supply circuit means including the off-centering voltage dividers 176 and 177 connected across the potential source +B, −B and coupled to the sweep-signal supply circuit terminals 51, 51 and 56, 56, respectively, to the adjustable electromechanical control means 70, through the corresponding amplifier circuit means 87 and 88, and to the output terminals 52, 52 and 57, 57 of the control system 50 for adjusting the average potential level of the sweep and position-control signals and for applying the adjusted signals to the display device 20 of Fig. 1 for controlling displacement of the geographical origin of the target indications displayed thereon.

The control system 50 preferably further includes compensating means coupled to the adjustable control means 70 and responsive to adjustment of the adjustable circuit means, for example, the amplifier-limiters 160 and 162 and associated feed-back voltage dividers 172 and 173, during one of the operating modes for providing a predetermined relationship between adjustment of the control means 70 and displacement of the target-locator indication 66 of Fig. 3a on the display device display screen 21. In connection with the adjustable range of view compensation feature of the present invention, the compensating means may include, for example, adjustable signal-attenuator means, such as adjustable voltage dividers 84 and 86 electrically coupled between the joystick control means 70 and the amplifier-limiter circuit means 160 and 162. The voltage dividers 84 and 86 are mechanically connected to a shaft 202 which is, in turn, mechanically coupled through a suitable flexible mechanism 203, braking means 201, a spring element 200, and shaft 204, having an omitted portion represented by broken line 205, to a gear 206 which is directly coupled to the adjustable gain-control knob 175 of the amplifier-limiters 160 and 162.

In connection with the off-centering compensation feature of the present invention, the compensating means may include, for example, direct-coupled signal-translating means coupled to the adjustable potential-supply means comprising the off-centering voltage dividers 176 and 177 and operative only during the coarse operating mode of the joy-stick control means 70 for supplying to the pedestal-generating circuit means 140 and 141 potentials representative of the off-centering potentials of the voltage dividers 176 and 177 to provide a predetermined relationship between the position of the joy-stick control means 70 and the position of the target-locator indication on the display device 20 to enable the position of the target-locator indication to be unaffected by adjustment of the off-centering voltage-divider means 176 and 177 during the coarse operating mode. For the vertical signal circuits, the direct-coupled signal-translating means may comprise, for example, conductors 181 and 182, a relay-controlled switch 183, and a conductor 184 which is connected to an input resistor 185 of the pedestal generator 140, the relay-controlled switch 183 being effective to render the direct-coupled signal-translating means operative only during the coarse operating mode of the joy-stick control means 70. Similarly, for the horizontal signal circuits, the direct-coupled signal-translating means may include conductors 190 and 191, a relay-controlled switch 192, and a conductor 193 connected to a suitable input circuit of the horizontal pedestal generator 141.

The control system 50 additionally includes means coupled to the compensating means, for example, the voltage dividers 84 and 86, and responsive to the operating mode of the adjustable control means 70 for enabling compensation to occur during the coarse operating mode, for preventing further compensation from occurring during the vernier operating mode, and for maintaining the compensation occurring during the last moment of the coarse operating mode throughout subsequent operation in the vernier operating mode. In connection with the adjustable range of view compensation feature of the present invention, this compensation control means may include braking means 201 for permitting adjustment of the voltage-divider compensating means 84 and 86 during the coarse operating mode, for preventing adjustment during the vernier mode, and for maintaining constant the compensation occurring during the last moment of the coarse operating mode throughout subsequent operation in the vernier operating mode. The compensation control means may also include a spring element 200 mechanically coupled between the voltage-divider compensating means 84 and 86 and the amplification-factor adjustment means 172 and 173 for enabling compensation to occur during the coarse operating mode, the spring element permitting adjustment of the amplification-factor adjustment means 172 and 173 and being stressed or wound by adjustment thereby during the vernier operating mode when the braking means is operative to brake the shaft 208 to enable the predetermined relationship between adjustment of the joy-stick 70 and displacement of the target-locator indication to be reestablished during subsequent operation in the coarse operating mode. The braking means 201 may be of the magnetically-actuated type and may include a face plate 207 connected to a shaft 208, braking shoes 209 connected to the frame of the braking means 201, and an actuating winding 210 for causing a longitudinal shift of the shaft 208 and face plate 207 to brake the shaft 208.

With respect to the off-centering compensation feature of the present invention, the compensation control means of the control system 50 may include, for example, relay-controlled switches 183 and 192 coupled to the direct-coupled signal-translating means for enabling compensation to occur during the coarse operating mode and for preventing compensation from occurring during the vernier operating mode. For maintaining the compensation occurring during the last moment of the coarse operating mode throughout subsequent operation in the vernier operating mode, the compensation control means further includes adjustable potential-supply circuit means such as the previously mentioned voltage dividers 109 and 123 coupled to the pedestal generators 140 and 141 through the relay-controlled switches 122 and 137 and coupled to the off-centering voltage dividers 176 and 177. To this end, the compensation control means may also include electromechanical means responsive to adjustment of the off-centering voltage-divider means 176 and 177 during the coarse operating mode of the joy-stick control means 70 for adjusting the potential-supply circuit means 109 and 123 to supply a potential component representative of the adjustment of the off-centering voltage-divider means 176 and 177 during the coarse operating mode and for utilizing the potential component for maintaining the compensation occurring during the last moment of the coarse operating mode throughout subsequent operation in the vernier operating mode. The electromechanical means just mentioned may include, for example, the vertical-signal and horizontal-signal direct-coupled amplifiers 110 and 124, the relay-controlled switches 111 and 127, and the motors 113 and 128 which are mechanically connected to the voltage dividers 109 and 123, respectively. The input circuits of the vertical-signal and horizontal-signal direct-coupled amplifiers 110 and 124 are, during the coarse operating mode, coupled to the respective vertical and horizontal off-centering voltage dividers 176 and 177 through the respective input resistors 117 and 133.

The direct-coupled amplifiers 96, 106, 110, and 124, the motors 113 and 128, and the amplifier-limiters 160 and 162 may be of conventional construction and operation so that a detailed description and explanation of the operation thereof are unnecessary herein.

*Operation of control system of Fig. 4*

Considering the operation of the control system 50 just described, the sweep generator and amplifier circuits of the radar system of Fig. 1 supply time-shared vertical and horizontal target-indication and cursor sweep-signal components to the respective sweep-signal input terminals 51, 51 and 56, 56 of the control system 50. The vertical and horizontal sweep-signal components are supplied through the input resistors 163 and 168 to the output amplifier-limiters 160 and 162, respectively. The output amplifier-limiters 160 and 162 amplify the sweep signals by an amount depending on the adjustment of the feedback voltage dividers 172 and 173 which supply degenerative feed-back signals through the resistors 166 and 171 to the input circuits of the amplifier-limiters 160 and 162, respectively, to control the effective gain thereof.

The output amplifier-limiters 160 and 162 also limit or suppress the amplified sweep-signal components to a predetermined magnitude level. The signal magnitude represented by the limiting level is preferably approximately the signal magnitude required to cause deflection of the electron beam of the image-reproducing device 20 to the edge of the display screen 21. The time required for the sweep-signal components to reach the limiting level depends on the sweep speed of the components and, hence, on the amplification that occurs in the amplifier portions. In this manner, adjustment of the feed-back voltage dividers 172 and 173 controls the geographical range of view of the surrounding terrain displayed on the display screen 21 of the image-reproducing device 20 of Fig. 1.

As the range of view is, for example, increased, the target scene as shown on the display screen 21 of Fig. 3c is contracted in order that the scene displayed may include more of the surrounding terrain. As a result, particular target indications such as indications 23, 24, and 25 of Fig. 3c move to the new positions 23a, 24a, and 25a closer to the center of the display screen. As the range of view is decreased, the reverse occurs.

As mentioned, it is desirable to control the position of the target-locator indication or cursor 66 of Fig. 3a, produced on the display screen 21 by the cursor sweep-signal components, by means of the joy-stick control means 70. By controlling the position of the movable gimbal ring segements 75 and 76, the control element 73 of the joy-stick control means 70 determines the potentials supplied by the movable arms of the respective voltage dividers 82 and 83. These potentials represent vertical and horizontal components of the position of the joy-stick control element 73 and thus are suitable to control the position of the cursor 66. To this end, the joy-stick control potentials are supplied through adjustable compensating voltage dividers 84 and 86, which operate in a manner more fully explained hereinafter, to the respective amplifier circuit means 87 and 88.

For maximum efficiency of operation and in order to enable utilization of desirable but conflicting features of a control system constructed in accordance with the present invention, the joy-stick control means 70 preferably has two modes of operation. To this end, the control button 77 and switch 79 enable the joy-stick control means 70 to have a coarse operating mode, during which the switch 79 is open and control voltage +V is not supplied to various relay-controlled switches of the control system 50, and to have a vernier operating mode, during which the switch 79 is closed and control voltage +V is supplied to the various relay-controlled switches. The various relay-controlled switches of the control system 50 of Fig. 4 are shown in positions corresponding to the vernier operating mode.

During the vernier operating mode, the joy-stick vertical position control signal from the joy-stick voltage divider 82 is supplied to the relay-controlled switch 89 and then through the input resistor 91 to the direct-coupled amplifier 96. The amplifier 96 is effective to deliver to the output terminals thereof an amplified control signal of reverse polarity. A portion of this amplified signal of reverse polarity is degeneratively supplied back through the feed-back resistor 93 to the input circuit of the amplifier 96. By properly selecting the relative values of the input adding resistor 91 and the feed-back resistor 93, the fraction of signal fed back to the input circuit of the amplifier 96 is effective to maintain the effective amplification factor of the amplifier circuit means 87 at unity. There is thus developed at the output circuit of the amplifier 96 during the vernier operating mode a direct-current control signal of magnitude equal to the magnitude of the direct-current control signal supplied by the vertical component joy-stick voltage divider 82 but of opposite polarity.

During the coarse operating mode, the relay-controlled switch 89 is effective to connect the input resistor 92 in parallel with the input resistor 91, thereby lowering the resistance in series with the input impedance of the amplifier 96. This increases the effectiveness of the input signal supplied to the amplifier 96 via the input resistor 91 and enables the amplifier circuit means 87 to have an over-all amplification factor to this input of, for example, 6.

In a similar manner, with respect to the horizontal control signal supplied by the horizontal joy-stick voltage divider 83, the relay-controlled switch 100 controls the input resistors in series with the input circuit of the direct-coupled amplifier 106, thereby enabling the amplifier circuit means 87 and 88 to have corresponding amplification factors of either unity or 6, depending on the position of the switches 89 and 100 which is determined by the operating mode of the joy-stick control means 70.

When switching from the coarse operating mode to the vernier mode, the over-all effective amplification factor of the vertical position control-signal amplifier circuit means 87 changes, but it is not desired that the magnitude of the position control signal at the output terminals of the vertical direct-coupled amplifier 96 change as this would cause an undesirable discontinuity in operation. In order to maintain constant the magnitude of the output position control signal, the vertical position control-signal channel, including voltage-divider means 109 and the vertical storage amplifier 110 and motor 113, supplies back to the input terminals of the direct-coupled amplifier 96 a signal to enable the same magnitude of output position control signal to be obtained after a change in operating mode.

Assume, for example, that the vertical channel amplifier circuit means 87 has an over-all effective amplification factor of 6 in the coarse operating mode and unity in the vernier operating mode. Assume further that the joy-stick control means 70 is initially operating in the coarse operating mode and is supplying, for example, a positive 2-volt control signal to the relay-controlled switch 89 of the amplifier circuit means 87 through the voltage dividers 82 and 84. The positive 2-volt control signal is amplified by a factor of 6 and inverted in polarity, and a negative 12-volt position control signal, therefore, appears at the output terminals of the amplifier 96.

If no means for maintaining constant the magnitude of the amplified output signal of the amplifier 96 were utilized, then upon switching to the unity gain vernier operating mode, the output signal would become a negative 2 volts in magnitude. Because the magnitude of the output signal of the amplifier 96 is determinative of the vertical position of the origin of the cursor 66, this change from 12 to 2 volts would cause an undesirable shift in position of the cursor origin. In the present system, however, the negative 12-volt output signal of the amplifier 96 during the coarse operating mode is supplied through the input resistor 116 to the input circuit of the amplifier 110 and the original positive 2-volt signal is supplied through the input resistor 115 so that the resultant effective signal supplied to the input adding circuit of the vertical-signal direct-coupled amplifier 110 is a negative 10 volts. This effective signal supplied to the amplifier 110 is amplified and used to actuate the motor 113 to control the inverse polarity potential supplied by the voltage divider 109 which, in turn, is supplied back to the input circuit of the amplifier 110 through resistor 118. In this manner, the voltage divider 109 is adjusted by the motor 113 until the magnitude of the inverse polarity potential supplied thereby equals the magnitude of the effective signal supplied to the amplifier 110 by the amplifier circuit means 87. The voltage divider 109, thus, supplies a positive 10-volt potential.

Now, upon switching to the unity gain vernier operating mode this positive 10-volt inverse potential is supplied through switch 122 to the input resistor 94 of the amplifier 96. In this manner, the resultant effective signal supplied to the input adding circuit of the amplifier 96 is a positive 12 volts which, for unity gain, again causes a negative 12-volt signal to appear at the output terimnals of the amplifier 96 thus giving no change in output signal as the operating mode is changed. When the system is returned again to the coarse operating mode, relay-controlled switch 122 removes the positive 10-volt potential supplied to the input circuit of the amplifier 96 by the voltage divider 109 so that the negative 12-volt output position control signal is again caused by the amplified 2-volt signal supplied by the joy-stick voltage divider 82.

In a similar manner, the voltage divider 123, horizontal-signal direct-coupled amplifier 124, and motor 128 of the horizontal position control-signal channel maintain constant the magnitude of the position control signal at the output terminals of the horizontal direct-coupled amplifier 106 when changing operating modes.

The vertical position control signal developed at the output circuit of the vertical direct-coupled amplifier 96 is supplied to the input circuit of the cathode-coupled amplifier stage 145 of the cursor vertical pedestal generator 140. The cathode-coupled amplifier stage 145 is normally nonconductive because current flow through the normally conductive gating-pulse responsive control tube 146 produces a potential drop across the common cathode resistor 148 sufficient to maintain the tubes of the amplifier stage 145 nonconductive. Periodically, negative time-sharing gating pulses corresponding to curve G of Fig. 2 are supplied through the gating-pulse input terminals 68, 68 of the control system 50 to the control tube 146 for rendering the tube 146 nonconductive, thereby decreasing the potential drop across the common cathode resistor 148 to render the amplifier stage 145 conductive and, thus, to enable amplification of the input direct-current control signal.

The amplified signal at the output electrode of the amplifier stage 145 is, in turn, supplied to the amplifier tube 147. Because of degenerative feedback through the feed-back resistor 149 of the output electrode of the amplifier tube 147, the over-all effective amplification factor of the amplifier stage 145 and tube 147 is for example, unity. The amplifier stage 145 may be adjusted to provide zero output potential for zero input potential by adjusting the bias potential supplied thereto by the adjustable potential supply network 154. There is, thus, developed at the output electrode of the amplifier tube 147 vertical position control pedestal signals, represented by curve M of Fig. 2, of duration equal to that of the time-sharing gating pulses represented by curve G and of magnitude equal to the magnitude of the direct-current control-signal or potential level at the input terminals of the pedestal generator 140 but of reverse polarity. For the vernier operating mode the magnitude and polarity of the pedestal signals are equal to the magnitude and polarity of the direct-current control signal supplied by the vertical joy-stick voltage divider 82 as represented by dotted curve L of Fig. 2. During the coarse operating mode, the magnitude of the pedestal signals exceeds that of the joy-stick control signal by an amount dependent on the amplification factor of the control-signal amplifier circuit means 87.

During intervals intervening the time-sharing gating intervals, the cathode-coupled amplifier stage 150 of the vertical pedestal generator 140 is conductive to establish a feed-back circuit between the output electrode and the input electrode of the amplifier tube 147 which is effective to maintain the potential at the output electrode of the tube 147 at a predetermined level, for example, a zero-potential level. The potential level maintained at the output electrode of the tube 147 may be adjusted by adjusting the bias potential supplied by the bias-potential supply network 154 to the amplifier stage 150. During time-sharing gating intervals, positive time-sharing gating pulses corresponding to curve F of Fig. 2 are supplied through the gating-pulse input terminals 69, 69 to the gating-pulse responsive control tube 151 to render it conductive and bias the amplifier stage 150 to a nonconductive condition. In this manner, the feed-back circuit including stage 150 of the pedestal generator 140 does not interfere with generation of the position control pedestal signals during the time-sharing gating intervals.

The vertical position control pedestal signals from the cursor vertical pedestal generator 140 are supplied through the input resistor 165 to the vertical output amplifier-limiter 160. The pedestal signals are combined by the input adding circuit with the video and cursor vertical sweep-signal components as represented by curves I and K, respectively, of Fig. 2 to give a resultant signal at the output terminals of the amplifier-limiter 160 as represented by curve N of Fig. 2. This resultant signal is supplied at the output terminals 52, 52 of the control system 50 to the vertical deflection winding 53 of the image-reproducing device 20 of Fig. 1.

The horizontal direct-current position control signal at the output circuit of the horizontal direct-coupled amplifier 106 is similarly supplied to the cursor horizontal pedestal generator 141 and is similarly effective to control the magnitude of the horizontal pedestal signals generated therein during time-sharing gating intervals. The horizontal pedestal signals are supplied through the input adding resistor 170 to the horizontal output amplifier-limiter 162 wherein they are likewise combined with the sweep signals to give an effective resultant output signal at the display-device output terminals 57, 57 of the control system 50 which is similar to that represented by curve N of Fig. 2.

The pedestal components in the vertical and horizontal output signals supplied to the display device 20 are effective to control the position of the starting point or origin 67 of the cursor 66 of Fig. 3d in accordance with the position of the joy-stick control element 73. According to the position of the joy-stick control element 73, the magnitude of the pedestal signals might be adjusted such that the cursor origin is shifted to other positions such as, for example, those represented by 67c and 67d of Fig. 3d, the cursor occupying the corresponding positions 66c and 66d. During the coarse operating mode, the increased amplification factors of the vertical and horizontal direct-current position control-signal amplifier circuit means 87 and 88 enable movement of the joy-stick control element 73 to control displacement of the cursor origin 67 anywhere over the face of the display screen 21. For the vernier operating mode, however, because of the decreased amplification, displacement of the cursor origin 67 is limited to a relatively small area of the display screen adjacent to the position at which the cursor origin 67 was last placed when in the coarse operating mode. Such a limited area of cursor origin displacement is represented by the area enclosed by dotted line 212 of Fig. 3d. The fact that a maximum movement of the joy-stick control element 73, when in the vernier operating mode, causes only a relatively small displacement of the cursor origin 67 about its former position enables rapid and accurate positioning of the cursor origin at a target indication. The coarse control in the coarse operating mode enables rapid approximate positioning of the cursor origin anywhere within a large area so that the combination of coarse and vernier operating modes enables rapid and accurate positioning of the cursor origin.

As mentioned, it is desirable that as the range of view of the surrounding terrain shown on the display screen 21 is adjusted, the cursor origin automatically track or follow a given target indication, such as indication 23 of Fig. 3c, upon which the cursor origin was earlier positioned. In this manner, as, for example, the range of view is adjusted as indicated in Fig. 3c, the cursor origin shifts from position 67 to 67e in the same manner as the target indication shifts from 23 to 23a. In the absence of certain compensating features, as will be presently mentioned, automatic tracking of a target indication by the cursor origin as the range of view is adjusted normally occurs because, by adjusting the amplification factors of the vertical and horizontal output amplifier-limiters 160 and 162, the magnitude of the cursor position control pedestal-signal components supplied to the image-reproducing device 20 is changed by the same factor as is the magnitude of the video sweep-signal components.

It is also desirable, as previously mentioned, in such a target-indicating system that the magnitude of joy-stick motion necessary to cause a given displacement of the cursor origin be the same for all operating conditions or, in other words, that the joystick have a constant "feel" with respect to movement of the cursor origin. A constant "feel" joystick, however, requires that the overall amplification of a cursor origin position control signal, from joy-stick control means 70 to image-reproducing device 20 remain constant in order that a variation in the electric signal representing joy-stick movement will always cause the same variation in the position of the cursor. This desirable result would, thus, conflict in system requirements with the advantageous feature of automatic tracking of the target indication as the range of view is adjusted because this tracking feature depends on adjustment of only the amplification factor of the vertical and horizontal output amplifier-limiters 160 and 162. Adjustment of only the amplification factor of the vertical and horizontal output amplifier-limiters 160 and 162 causes the joy-stick control element 73 to have, so to speak, a new "feel" for each setting of the gain-control knob 175, thus, handicapping the operator in resetting the cursor origin over a new target indication.

In accordance with the present invention, both of these advantageous features are utilized by using compound joy-stick control means 70. Accordingly, during the vernier operating mode the cursor origin is allowed automatically to track the target indication as the gain of the output amplifier-limiters 160 and 162 and, thus, the range of view is changed while, during the coarse operating mode, compensation is furnished to provide a constant and predetermined relationship between joy-stick movement and cursor origin displacement. This is a satisfactory solution because a constant "feel" joystick is most desirable during the course operating mode when, due to the increased amplification of the amplifier circuit means 87 and 88 during this operating mode, the joy-stick control over the cursor origin is most sensitive.

This adjustable range compensation during the coarse operating mode is furnished by the adjustable signal attenuator or voltage-divider means 84 and 86. These compensating voltage dividers affect the position control signals in a manner inversely related to the effect of the amplification factor of the amplifier-limiters 160 and 162, that is, as the gain of the amplifier-limiters is increased, the attenuation, due to the compensating voltage dividers 84 and 86, is increased by a corresponding amount, thus enabling the over-all amplification of position control signals from joy-stick control means 70, to the output circuits of the amplifier limiters 160 and 162, to remain constant, thereby maintaining a constant predetermined relationship between joy-stick movement and cursor origin displacement.

The adjustable range compensation voltage dividers 84 and 86 cannot, however, be directly and permanently connected to the gain-control feed-back voltage dividers 172 and 173 of the amplifier limiters 160 and 162 because the compensating voltage dividers 84 and 86 must not change during the vernier operating mode so that the cursor origin may automatically track a target indication as the range of view is adjusted. Accordingly, during the vernier operating mode, the electrically controlled braking means 201 brakes the shaft 208 which is mechanically connected to the compensating voltage dividers 84 and 86. Further change in gain of the amplifier-limiters 160 and 162 during the vernier operating mode is enabled by a spring element 200 coupled between shaft 208 and gain-control voltage-divider shaft 174, the spring being stressed so that when the joy-stick control means 70 is returned to the coarse operating mode, the compensating voltage dividers 84 and 86 may be initially adjusted automatically for any changes in gain that have occurred while the compensating voltage dividers were maintained in a fixed position by the braking means 201. Thus, as the shaft portion 204 rotates in response to adjustment of the gain-control knob 175, it is effective to stress or wind up the spring 200. Upon a return to the coarse operating mode, the friction contact between the face plate 207 and the brake shoes 209 of the braking means 201 is released, thus enabling the wound-up spring to rotate the shaft 208 which, in turn, rotates the flexible coupling 203 and, thus, the shaft 202 initially to adjust the compensating voltage dividers 84 and 86 for the previous vernier operating mode change in gain. Subsequent thereto during the coarse operating mode, the shaft 208 is free to rotate in response to rotation of the shaft 204, thus allowing direct and immediate adjustment of the adjustable range compensation voltage dividers 84 and 86.

As previously mentioned, it is also desirable that the target-indicating system include provision for off-centering the target scene being displayed on the display screen of the image-reproducing device. This feature is illustrated by the shift in target scene shown in Fig. 3e provided by off-centering control. The geographical center of the surrounding terrain has been effectively off-centered from position 22 to a position 22b lying off the display screen 21. The target indications formerly at positions 23, 24, and 25 of Fig. 3a are similarly shifted to corresponding positions 23b, 24b, and 25b of Fig. 3e, the target indication formerly represented at position 24 now lying off the face of the display screen as indicated by the imaginary dotted indication 24b.

It is desirable, in a target-indicating system having provision for off-centering the target scene, that each possible position of the joy-stick control element 73 represent a corresponding position of the cursor origin on the display screen 21 regardless of the amount the target scene is off-centered. This feature is particularly useful when shifting the cursor origin to a new target indication because it enables the operator, without hesitation or trial-and-error delay, to move the joy-stick control element 73 by the proper amount and direction. This advantageous feature, however, requires that the position of the cursor origin be unaffected by off-centering of the target scene and, hence, is in conflict in system requirements with the advantageous feature that the cursor origin automatically track a given target indication as the target scene is off-centered.

In accordance with the present invention, both of these advantageous features are provided by using a compound joy-stick control means 70. Accordingly, during the coarse operating mode of the joy-stick control means 70, the position of the joy-stick control element 73 represents a given position of the cursor origin on the display screen 21 while during the vernier operating mode the cursor origin automatically tracks a given target indication as the target scene is off-centered.

Off-centering of the target scene is accomplished by means of the adjustable voltage-divider potential-supply circuit means 176 and 177 which are individually coupled through the corresponding input resistors 164 and 169 to the input circuits of the vertical and horizontal output amplifier-limiters 160 and 162. Because the off-centering potentials supplied by these off-centering voltage dividers are continuously supplied, the entire target scene as well as the cursor origin is shifted with respect to the center of the display screen 21, thus enabling automatic tracking of a target indication by the cursor origin as the target scene is off-centered during the vernier operating mode.

During the coarse operating mode, however, the potentials from the off-centering voltage dividers 176 and 177 are also supplied to the position control-signal input circuits of the vertical and horizontal pedestal generators 140 and 141. The vertical off-centering potential is supplied to the vertical pedestal generator 140 by the conductors 181 and 182, relay-controlled switch 183, and conductor 184 while the horizontal off-centering potential is supplied to the horizontal pedestal generator 141 by the conductors 190 and 191, relay-controlled switch 192, and conductor 193. The relay-controlled switches 183 and 192 enable the off-centering potentials to be supplied to the pedestal generators only during the coarse operating mode.

The off-centering potentials supplied to the pedestal generators 140 and 141 during the coarse operating mode serve to modify the magnitudes of the cursor position control pedestal signals supplied by the pedestal generators 140 and 141 in a manner inversely related to the off-centering potentials in order that the position of the cursor origin on the display will not be affected by off-centering of the target scene. This occurs because polarity inversion in the pedestal generators causes the output pedestal signals to be of polarity opposite to that of the net effective control signals, including the off-centering potentials, supplied to the input circuits of the pedestal generators 140 and 141. In this manner, a positive increase in the magnitude of vertical off-centering potential, for example, causes a corresponding decrease or negative increase in the magnitude of the vertical pedestal signal so that during cursor pedestal intervals the effective direct-current pedestal component combined with the cursor vertical sweep-signal component at the output of the vertical amplifier-limiter 160 remains substantially constant and independent of the off-centering potential.

As pointed out, when the control system 50 is switched to the vernier operating mode, the off-centering potentials are no longer supplied to the pedestal generators 140 and 141, hence, because the off-centering potentials are still supplied directly to the output amplifier-limiters 160 and 162, the cursor origin would suddenly shift in response to these off-centering potentials. Such a shift is undesirable as it results in discontinuous control over the position of the cursor origin. To overcome this undesired result the off-centering potentials are, during the coarse operating mode, also supplied directly to compensation control means responsive to the off-centering potentials for storing potential components representative thereof during the coarse operating mode and for utilizing these stored potential components during the vernier operating mode for maintaining the cursor origin at the former coarse operating mode position on the display screen 21. The circuit means, including the voltage dividers 109 and 123, the amplifiers 110 and 124, and the motors 113 and 128, formerly mentioned, for maintaining constant the magnitude of the position control signals at the output terminals of the vertical and horizontal direct-coupled amplifiers 96 and 106, respectively, as the operating mode is changed are also suitable for performing this off-centering compensation control function.

Accordingly, during the coarse operating mode, the vertical and horizontal off-centering potentials are also supplied directly to the corresponding vertical and horizontal direct-coupled amplifiers 110 and 124 and are effective to control the respective motors 113 and 128 so as to adjust the respective voltage dividers 109 and 123 to supply an inverse polarity potential component of magnitude equal to the magnitude of the off-centering potentials. These inverse polarity off-centering compensation potential components are supplied to the input circuits of the corresponding direct-coupled amplifiers 96 and 106 by means of the relay-controlled switches 122 and 137 during the vernier operating mode. These components are effective to produce at the output terminals the amplifiers 96 and 106 potential components equal to the previous coarse operating mode off-centering potentials supplied to the pedestal generators 140 and 141 by the off-centering voltage dividers 176 and 177, thus, preventing a change in position of the cursor origin as the control system 50 is switched to the vernier operating mode.

During the vernier operating mode further adjustment of the off-centering voltage dividers 176 and 177 causes a change in the position of the cursor origin corresponding to the change in target scene because direct off-centering potentials are no longer supplied through the relay-controlled switches 183 and 192 to the pedestal generators 140 and 141. In this manner, automatic tracking of a target indication may occur as the target scene is off-centered.

From the foregoing description of the various features of the invention it will be apparent that a control system constructed in accordance with the present invention represents a new and improved control system for use in a target-indicating display system wherein the advantages of a constant joy-stick movement-cursor origin displacement relationship and a fixed relationship between the position of a joy-stick control and the position of a cursor origin are utilized while at the same time retaining the advantages of automatic tracking of a target indicating as either the range of view is changed or off-centering of the target scene is adjusted and the ability to use the joy-stick control as a vernier control of the cursor origin.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a target-indicating system for displaying target indications and a target-locator indication adjustable relative thereto and including a target-indicator and target-locator display device, a control system comprising: first circuit means for supplying time-shared target-indication and target-locator sweep signals and for applying said sweep signals to said display device; adjustable electromechanical control means including a control element having two dimensions of adjustment for supplying first and second control signals individually representative of adjustments of said control element with respect to said dimensions; and a pair of pedestal-generating circuit means individually responsive to said control signals for supplying first and second target-locator position-control pedestal signals to said first circuit means for effecting a two dimensional displacement of the origin of said target-locator indication on said display device independently of the target display.

2. In a target-indicating system for displaying target indications and a target-locator indication adjustable relative thereto and including a target-indicator and target-locator display device, a control system comprising: first circuit means for supplying time-shared target-indication and target-locator sweep signals and for applying said sweep signals to said display device; adjustable electromechanical control means having two operating modes and including a control element having two dimensions of adjustment for supplying first and second control signals individually representative of adjustments of said control element with respect to said dimensions; a pair of amplifier circuit means individually responsive to adjustment of said control means for amplifying said control signals by a first factor during a first operating mode of said control means and by a second factor during a second operating mode thereof; means responsive to said amplified control signals for storing information representative thereof during said first operating mode; and a pair of pedestal-generating circuit means individually responsive to said amplified first and second control signals during said first mode and responsive to said stored information and said first and second signals during said second mode for supplying first and second target-locator position-control pedestal signals to said first circuit means for effecting a two-dimensional displacement of said target-locator indication on said display device during said two operating modes.

3. In a target-indicating system for displaying target indications and a target-locator indication adjustable relative thereto and including a target-indicator and target-locator display device, a control system comprising: first circuit means for supplying time-shared target-indication and target-locator sweep signals and for applying said sweep signals to said display device; adjustable electromechanical control means having coarse and vernier operating modes and including a joy-stick control element having two dimensions of adjustment for supplying first and second direct-current control signals individually representative of adjustments of said control element with respect to said dimensions; a pair of direct-coupled amplifier circuits individually responsive to adjustment of said control means for amplifying said control signals by a large factor during said coarse operating mode and by a relatively small factor during said vernier operating mode; voltage-divider means and electromechanical means responsive to said amplified control signals for adjusting the same to store potentials representative of said amplified control signals during said coarse operating mode; and a pair of pedestal-generating circuit means individually responsive to said amplified first and second direct-current control signals during said coarse mode and responsive to said stored potentials and said first and second signals during said vernier mode for supplying first and second target-locator position-control pedestal signals to said first circuit means for effecting a two-dimensional displacement of said target-locator indication on said display device during said operating modes.

4. In a target-indicating system for displaying target indications and a target-locator indication adjustable relative thereto and including a target-indicator and target-locator display device, a control system comprising: circuit means for supplying target-indication and target-locator sweep signals; adjustable control means having two operating modes for supplying a target-locator position-control signal for controlling the position of the origin of said target-locator indication independently of the target display; adjustable circuit means coupled to said signal-supply circuit means, to said adjustable control means, and to said display device for adjusting a characteristic of said sweep and position-control signals and for applying the adjusted signals to said display device; and compensating means coupled to said adjustable control means and responsive to adjustment of said adjustable circuit means during one of said operating modes for providing a predetermined relationship between adjustment of said control means and displacement of said target-locator indication on said display device.

5. In a target-indicating system for displaying target indications and a target-locator indication adjustable relative thereto and including a target-indicator and target-locator display device, a control system comprising: circuit means for supplying time-shared target-indication and target-locator sweep signals; adjustable electromechanical control means having two operating modes and including a control element having two dimensions of adjustment for supplying first and second control signals individually representative of adjustments of said control element with respect to said dimensions; a pair of pedestal-generating circuit means individually responsive to said control signals for supplying first and second target-locator position-control pedestal signals during intervals of said target-locator sweep signals to effect a two-dimensional displacement of said target locator on said display device; adjustable circuit means coupled to said signal-supply circuit means, to said pedestal-generating circuit means, and to said display device for adjusting a characteristic of said sweep and position-control pedestal signals and for applying the adjusted signals to said display device; and compensating means coupled to said adjustable control means and responsive to adjustment of said adjustable circuit means during one of said operating modes for providing a predetermined relationship between adjustment of said control element and displacement of said target-locator indication on said display device.

6. In a target-indicating system for displaying target indications and a target-locator indication adjustable relative thereto and including a target-indicator and target-locator display device, a control system comprising: circuit means for supplying target-indication and target-locator sweep signals; adjustable electromechanical control means having coarse and vernier operating modes for supplying control signals representative of adjustments thereof; amplifier circuit means responsive to adjustment of said control means for amplifying said control signals by a large factor during said coarse operating mode and by a relatively small factor during said vernier operating mode; voltage-divider means and electromechanical means responsive to said amplified control signals for adjusting said voltage-divider means to store potentials representative of said amplified control signals during said coarse operating mode; pedestal-generating circuit means responsive to said amplified control signals during said coarse mode and responsive to said stored potentials and said control signals during said vernier mode for supplying target-locator position-control pedestal signals; adjustable circuit means coupled to said signal-supply circuit means, to said pedestal-generating circuit means, and to said display device for adjusting a characteristic of said sweep and position-control pedestal signals and for applying the adjusted signals to said display device; and compensating means coupled to said adjustable electromechanical control means and responsive to adjustment of said adjustable circuit means during one of said operating modes for providing a predetermined relationship between adjustment of said electromechanical control means and displacement of said target-locator indication on said display device.

7. In a target-indicating system for displaying target indications and a target-locator indication adjustable relative thereto and including a target-indicator and target-locator display device, a control system comprising: circuit means for supplying target-indication and target-locator sweep signals; adjustable control means having two operating modes for supplying target-locator position-control signals; adjustable circuit means coupled to said signal-supply circuit means, to said adjustable control means, and to said display device for adjusting a characteristic of said sweep and position-control signals and for applying the adjusted signals to said display device; compensating means coupled to said adjustable control means and responsive to adjustment of said adjustable circuit means during a first of said operating modes for providing a predetermined relationship between adjustment of said control means and displacement of said target-locator indication on said display device; and means coupled to said compensating means and responsive to the operating mode of said adjustable control means for enabling compensation to occur during said first operating mode, for preventing further compensation from occurring during a second of said operating modes, and for maintaining the compensation occurring during the last moment of said first operating mode throughout subsequent operation in said second operating mode.

8. In a target-indicating system for displaying target indications and a target-locator indication adjustable relative thereto and including a target-indicator and target-locator display device, a control system comprising: circuit means for supplying target-indication and target-locator sweep signals; adjustable control means having two operating modes for supplying target-locator position-control signals; adjustable-gain amplifier-limiter circuit means coupled to said signal-supply circuit means, to said adjustable control means, and to said display device for adjusting the instantaneous magnitude of said sweep and position-control signals and for applying the adjusted signals to said display device; compensating means coupled to said adjustable control means and responsive to adjustment of said amplifier-limiter gain during a first of said operating modes for providing a predetermined relationship between adjustment of said control means and displacement of said target-locator indication on said display device; and means coupled to said compensating means and responsive to the operating mode of said adjustable control means for enabling compensation to occur during said first operating mode, for preventing further compensation from occurring during a second of said operating modes, and for maintaining the compensation occurring during the last moment of said first operating mode throughout subsequent operation in said second operating mode.

9. In a target-indicating system for displaying target indications and a target-locator indication adjustable relative thereto and including a target-indicator and target-locator display device, a control system comprising: circuit means for supplying target-indication and target-locator sweep signals; adjustable control means having two operating modes for supplying target-locator position-control signals; adjustable circuit means coupled to said signal-supply circuit means, to said adjustable control means, and to said display device for adjusting a characteristic of said sweep and position-control signals and for applying the adjusted signals to said display device; compensating means coupled to said adjustable control means and responsive to adjustment of said adjustable circuit means during a first of said operating modes for providing a predetermined relationship between adjustment of said control means and displacement of said target-locator indication on said display device; and means including a brake and a spring element coupled to said compensating means and responsive to the operating mode of said adjustable control means for enabling compensation to occur during said first operating mode, for preventing further compensation from occurring during a second of said operating modes, and for maintaining the compensation occurring during the last moment of said first operating mode throughout subsequent operation in said second operating mode.

10. In a target-indicating system for displaying target indications and a target-locator indication adjustable relative thereto and including a target-indicator and target-locator display device, a control system comprising: circuit means for supplying target-indication and target-locator sweep signals; joy-stick control means having two operating modes for supplying target-locator position-control signals; adjustable circuit means coupled to said signal-supply circuit means, to said joy-stick control means, and to said display device for adjusting a characteristic of said sweep and position-control signals and for applying the adjusted signals to said display device; adjustable signal-attenuator compensating means coupled to said joy-stick control means and responsive to adjustment of said adjustable circuit means for providing a predetermined relationship such that movement of said joy-stick control means causes a proportional movement of said target-locator indication on said display device, said proportion being constant and independent of adjustment of said adjustable circuit means during a first of said operating modes; braking means for preventing adjustment of said attenuator compensating means during a second of said operating modes and for maintaining the compensation occurring during the last moment of said first operating mode throughout subsequent operation in said second operating mode; and a spring element mechanically coupled between said attenuator compensating means and said adjustable circuit means for enabling compensation to occur during said first operating mode, said spring element being stressed by adjustment of said adjustable circuit means during said second operating mode when said braking means is operative to enable said predetermined realtionship to be re-established during subsequent operation in said first operating mode.

11. In a target-indicating system for displaying target indications and a target-locator indication adjustable relative thereto and including a target-indicator and target-locator display device, a control system comprising: circuit means for supplying target-indication and target-locator sweep signals; joy-stick control means having two operating modes for supplying target-locator position-control signals; amplifier-limiter circuit means including means for adjusting the amplification factor of said amplifier and coupled to said signal-supply circuit means, to said joy-stick control means, and to said display device for adjusting a characteristic of said sweep and position-control signals and for applying the adjusted signals to said display device; adjustable voltage-divider compensating means electrically coupled between said joy-stick control means and said amplifier-limiter circuit means and responsive to adjustment of said amplification-factor adjustment means for providing a predetermined relationship such that movement of said joy-stick control means causes a proportional movement of said target-locator indication on said display device, said proportion being constant and independent of adjustment of said amplification-factor adjustment means during a first of said operating modes; braking means for preventing adjustment of said voltage-divider compensating means during a second of said operating modes and for maintaining the compensation occurring during the last moment of said first operating mode throughout subsequent operation in said second operating mode; and a spring element mechanically coupled between said voltage-divider compensating means and said amplification-factor adjustment means for enabling compensation to occur during said first operating mode, said spring element being stressed by adjustment of said amplification-factor adjustment means during said second operating mode when said braking means is operative to enable said predetermined relationship to be re-established during subsequent operation in said first operating mode.

12. In a target-indicating system for displaying target indications and a target-locator indication adjustable relative thereto and including a target-indicator and target-locator display device, a control system comprising: circuit means for supplying target-indication and target-locator sweep signals; adjustable control means having two operating modes for supplying target-locator position-control signals; adjustable potential supply-circuit means coupled to said signal-supply circuit means, to said adjustable control means, and to said display device for adjusting a potential component of said sweep and position-control signals and for applying the adjusted signals to said display device for controlling displacement of the geographical origin of said target indications displayed thereon; compensating means coupled to said adjustable control means and responsive to adjustment of said adjustable potential supply-circuit means during a first of said operating modes for providing a predetermined relationship between adjustment of said control means and displacement of said target-locator indication on said display device; and means coupled to said compensating means and responsive to the operating mode of said adjustable control means for enabling compensation to occur during said first operating mode, for preventing further compensation from occurring during a second of said operating modes, and for maintaining the compensation occurring during the last moment of said first operating mode throughout subsequent operation in said second operating mode.

13. In a target-indicating system for displaying target indications and a target-locator indication adjustable relative thereto and including a target-indicator and target-locator display device, a control system comprising: circuit means for supplying target-indication and target-locator sweep signals; adjustable control means having two operating modes for supplying target-locator position-control signals; adjustable circuit means coupled to said signal-supply circuit means, to said adjustable control means, and to said display device for adjusting a characteristic of said sweep and position-control signals and for applying the adjusted signals to said display device; compensating means including direct-coupled signal-translating means coupled between said adjustable control means and said adjustable circuit means and responsive to adjustment of said adjustable circuit means during a first of said operating modes for providing a predetermined relationship between adjustment of said control means and displacement of said target-locator indication on said display device; and means coupled to said compensating means and responsive to the operating mode of said adjustable control means for enabling compensation to occur during said first operating mode, for preventing further compensation from occurring during a second of said operating modes, and for maintaining the compensation occurring during the last moment of said first operating mode throughout subsequent operation in said second operating mode.

14. In a target-indicating system for displaying target indications and a target-locator indication adjustable relative thereto and including a target-indicator and target-locator display device, a control system comprising: circuit means for supplying target-indication and target-locator sweep signals; joy-stick control means having coarse and vernier operating modes for supplying target-locator position-control signals; pedestal-generating circuit means responsive to said position-control signals for supplying target-locator position-control pedestal signals; first adjustable potential supply-circuit means coupled to said signal-supply circuit means and to said display device for adjusting a potential component of said sweep and position-control signals and for applying the adjusted signals to said display device for controlling displacement of the geographical origin of said target indications displayed thereon; compensating means including direct-coupled signal-translating means coupled to said first potential supply-circuit means and operative only during said coarse operating mode for supplying to said pedestal-generating circuit means compensation potentials representative of said first potentials to provide a predetermined relationship between the position of said joy-stick control means and the position of said target-locator indication on said display device to enable the position of said target-locator indication to be unaffected by adjustment of said first potential supply-circuit means during said coarse operating mode; second adjustable potential supply-circuit means coupled to said pedestal-generating circuit means; and electro-mechanical means responsive to adjustment of said first potential supply-circuit means during said coarse operating mode for adjusting said second potential supply-circuit means to supply a potential component representative thereof during said coarse operating mode and for utilizing said potential component for maintaining the compensation occurring during the last moment of said coarse operating mode throughout subsequent operation in said vernier operating mode.

References Cited in the file of this patent
UNITED STATES PATENTS

| | | |
|---|---|---|
| 2,610,319 | Page | Sept. 9, 1952 |
| 2,640,984 | Sherwin | June 2, 1953 |
| 2,712,647 | Sherwin | July 5, 1955 |